United States Patent
Benz et al.

(10) Patent No.: US 9,203,235 B2
(45) Date of Patent: Dec. 1, 2015

(54) METHOD FOR MONITORING A DISCONNECTION DEVICE, IN PARTICULAR A SERVICE PLUG OR A SERVICE SOCKET, IN A BATTERY SYSTEM, AND CORRESPONDING MONITORING DEVICE

(71) Applicants: Robert Bosch GmbH, Stuttgart (DE); Samsung SDI Co., LTD., Yongin-si, Gyeonggi-do (KR)

(72) Inventors: Stefan Benz, Stuttgart (DE); Holger Fink, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 120 days.

(21) Appl. No.: 13/923,706

(22) Filed: Jun. 21, 2013

(65) Prior Publication Data

US 2013/0342945 A1    Dec. 26, 2013

(30) Foreign Application Priority Data

Jun. 22, 2012 (DE) .......................... 10 2012 210 620

(51) Int. Cl.
*H02H 7/18* (2006.01)
(52) U.S. Cl.
CPC ...................................... *H02H 7/18* (2013.01)
(58) Field of Classification Search
CPC ........................................................ H02H 7/18
USPC ............................................................ 361/86
See application file for complete search history.

(56) References Cited

U.S. PATENT DOCUMENTS

| | | | |
|---|---|---|---|
| 6,031,302 A | 2/2000 | Levesque | |
| 8,054,043 B2 | 11/2011 | Yano | |
| 2002/0017405 A1* | 2/2002 | Nada | 180/65.2 |
| 2008/0297303 A1 | 12/2008 | Tabatowski-Bush et al. | |
| 2009/0267566 A1* | 10/2009 | Yano | 320/118 |
| 2011/0050204 A1 | 3/2011 | Park | |
| 2011/0261498 A1* | 10/2011 | Ikeda et al. | 361/160 |
| 2014/0176034 A1* | 6/2014 | Matsumura et al. | 318/430 |

FOREIGN PATENT DOCUMENTS

DE        102 21 086 A1    11/2003

* cited by examiner

*Primary Examiner* — Scott Bauer
(74) *Attorney, Agent, or Firm* — Maginot, Moore & Beck LLP

(57) ABSTRACT

A method is used to monitor a disconnection device of a battery system having a battery with a plurality of battery cells. The method includes using a monitoring device, which is connected to the disconnection device, to detect a negative voltage or a positive voltage which is applied to connections of the disconnection device. The method also includes evaluating the detected applied negative voltage or positive voltage to establish a functional state of the disconnection device. The method also includes initiating measures to protect the battery system against manipulation of its disconnection device when a value of detected applied negative voltage or positive voltage exceeds a predetermined threshold value.

10 Claims, 3 Drawing Sheets

METHOD FOR MONITORING A DISCONNECTION DEVICE, IN PARTICULAR A SERVICE PLUG OR A SERVICE SOCKET, IN A BATTERY SYSTEM, AND CORRESPONDING MONITORING DEVICE

This application claims priority under 35 U.S.C. §119 to patent application no. DE 10 2012 210 620.0, filed on Jun. 22, 2012 in Germany, the disclosure of which is incorporated herein by reference in its entirety.

The present disclosure relates to a method and to a corresponding monitoring device for monitoring a disconnection device, for example a service plug or a service socket, of a battery system which comprises a battery with a plurality of battery cells. The disclosure also relates to a battery system having a battery, a disconnection device and a monitoring device. The disclosure further relates to a vehicle having a monitoring device.

BACKGROUND

FIG. 1 shows the basic circuit diagram of a battery system 10 which is known from the prior art. The battery system 10 comprises a battery 20 which has a plurality of battery cells 21 which are connected in series. Since the plurality of battery cells 21 are connected in series, the battery system 10 can provide a total voltage of the battery cells 21. The battery system 10 further comprises a plurality of cell monitoring apparatuses ("Cell Supervision Circuits"). A cell monitoring apparatus 30 (CSC) of this kind is in each case electrically connected to the connections (not identified) of one or more battery cells 21 and is configured to detect the respective individual voltages of all the battery cells 21 which are connected to it. A cell monitoring apparatus 30 is further configured to measure the temperature of the battery cells 21 which are connected to it. Other hardware solutions are also feasible for the cell monitoring apparatuses 30 which are illustrated in FIG. 1. Furthermore, a battery system 10 can also comprise circuits for charge equalization of the battery cells 21 (cell balancing) which are generally connected in parallel with the battery cells 21 and are often configured as a constituent part of the cell monitoring apparatuses 30. In order to simplify the illustration from FIG. 1, the circuits for charge equalization of the battery cells 21 are not separately illustrated.

A charging and disconnection device 40 is connected between the battery cells 21, which are connected in series, and a positive battery terminal 22. The charging and disconnection device 40 comprises a relay 41 which is connected in parallel with a series circuit comprising a further relay 42 and a charging resistor 43. Furthermore, a disconnection device 50 which is formed from a relay is connected between the battery cells 21, which are connected in series, and the negative battery terminal 23. The disconnection and charging devices 40, 50 are each configured to disconnect the battery cells 21 from the battery terminals 22, 23 in order to thereby remove voltage from the battery terminals 22, 23.

The battery system 10 further comprises a central battery controller (Battery Control Unit) 60 which is configured to control the battery system 10 or the battery 20. The battery controller (BCU) 60 is connected to the cell monitoring apparatuses 30 by means of an internal bus system 70 and is configured to detect the current in the current path of the battery system 10 by means of current sensors 80, 90. Furthermore, the battery controller 60 is configured to drive the relays 41, 42, 50, which are present in the charging and disconnection devices 40, 50, by means of corresponding control lines 100, 110 in each case. The battery controller 60 is also connected to the battery terminals 22, 23 by means of electrical lines 120, 130. The battery controller 60 can further be connected to a vehicle interface by means of a CAN bus system 140.

As shown in FIG. 1, a disconnection device 150 is present in the current path of the battery system 10, it being possible for the said disconnection device to be configured, in particular, as a service plug ("service disconnect") or as a service socket. To this end, the pins 151, 152 of the service socket are connected by a service plug 153. In this case, the disconnection device 150 is typically configured such that the battery cells 21 can be divided into two separate blocks by this disconnection device 150. The disconnection device 150 is generally fitted to the outside of the battery system 10 and allows, in particular maintenance and servicing work, the battery terminals, that is to say the connections 22, 23 of the battery system 10, to be switched to be free of current and free of voltage in a defined manner by pulling out the service plug 153 in order to be able to work on the vehicle in which the battery system 10 is installed without risk. For this reason, the disconnection device 150 is integrated in the battery system 10 in such a way that the contacts or the connections 151, 152 (pins) of the disconnection device 150 are accessible from outside the battery system 10.

However, since the connections 151, 152 (pins) of the disconnection device 150 are accessible from outside the battery system 10, there is also a possibility of misuse. For example, it is possible, in principle, for third parties to connect additional battery cells or batteries from the outside by means of the connections 151, 152 of the disconnection device 150 when the service plug 153 is removed.

FIG. 2 shows the same battery system 10 as in FIG. 1, wherein, in contrast to FIG. 1, additional battery cells or batteries 160 are connected between the connections 151, 152 of the disconnection device 150. As a result, the total voltage of the battery system 10 and therefore the performance can be increased (so-called "tuning"). However, these externally connected batteries or battery cells 160 are not subject to the voltage and temperature monitoring which is carried out by means of the cell monitoring apparatuses 30. Therefore, calculation of the parameters which are relevant for performance, reliability and safety of the battery system 10, such as the "state of charge", the age ("state of health") or the functional state ("state of function"), is no longer possible or is possible only such that it is faulty. Charge equalization of the battery cells 21, that is to say cell balancing of the entire battery system 10, as described above is no longer possible either since the internal calculations are corrupted by the presence of the additionally connected battery cells or batteries 160. Consequently, the service life and the storage capacity of all the battery cells 21 of the battery system 10 fall. In the extreme case, the improper use of the disconnection device 150 described here may even lead to safety-critical situations.

One disadvantage of the conventional battery systems is that manipulation of the connections 151, 152, for example those cited further above, can be identified only with difficulty or great difficulty and therefore are also difficult to avoid. For example, misuse of the disconnection device 150 in the conventional battery system 10 shown in FIGS. 1 and 2 is often not identified even though the total voltage of the battery system or of the battery pack 10 is monitored. This is because, depending on the existing state of charge of the battery 20 which is produced, for example, as a result of the drop in the terminal voltage of the battery cells 21 with a falling state of charge (SOC), the measured total voltage of the battery system 10 is always within a permissible tolerance range. In other words, when the total voltage of the battery system is still within a permissible tolerance range, connection of an external battery 160 to the connections (terminals) 151, 152 of the disconnection device (service disconnect) 150 cannot be identified.

Furthermore, document DE 102 21 086 A1 discloses a control apparatus for a motor vehicle, which control apparatus is mounted on a printed circuit board panel during production. The printed circuit board panel comprises an interface and a plurality of data conductor tracks which are connected to the interface and run within the printed circuit board panel. Data is input into the control unit via the interface and the data conductor tracks. In this case, a printed circuit board is separated from the printed circuit board panel during production in such a way that the control unit remains on the separated printed circuit board, the interface remains on a remainder of the panel, and sectional faces of the data conductor tracks remain in an edge of the printed circuit board. This makes mechanical access to the data conductor tracks and therefore also unauthorized access to the data entered into the control unit considerably more difficult.

SUMMARY

The disclosure provides a method for monitoring the disconnection device of a battery system which has a battery with a plurality of battery cells. According to the disclosure, a negative or positive voltage which is applied to the connections of the disconnection device is detected by means of a monitoring device which is connected to the disconnection device and is evaluated in order to establish the functional state of the disconnection device. Furthermore, when the value of the detected voltage exceeds a predetermined threshold value, measures for protecting the battery system against manipulation of its disconnection device are initiated.

Furthermore, a monitoring device for monitoring the disconnection device of a battery system having a battery with a plurality of battery cells is provided according to the disclosure. According to the disclosure, the monitoring device is configured such that it can be electrically connected to the connections of the disconnection device of the battery system. The monitoring device is further configured to detect the negative or positive voltage which is applied to the connections of the disconnection device and to evaluate the said voltage in order to establish the functional state of the disconnection device. The monitoring device is further configured, when the value of the detected voltage exceeds a predetermined threshold value, to initiate measures for protecting the battery system against manipulation of its disconnection device.

In one very advantageous embodiment of the disclosure, information which relates to the existing situation of the threshold value being exceeded can be entered in a fault memory, which is contained in the monitoring device or is connected to the monitoring device, for further evaluation as a measure for protecting the battery system. Furthermore, the battery can be disconnected as a measure for protecting the battery system against manipulation of its disconnection device. Information relating to the existing situation of the threshold value being exceeded can be communicated to a controller, which is contained in the monitoring device or is connected to the monitoring device, for further evaluation as a measure for protecting the battery system.

In another particularly advantageous embodiment of the disclosure, the negative or positive voltage which is applied to the connections of the disconnection device is detected continuously or periodically.

The method according to the disclosure and the monitoring device can be used to monitor the connections or the disconnection device (service disconnect), as a result of which manipulation which involves connection of additional battery cells or batteries between the connections of the operating device of a battery system or which would result in an undesired increase in power of the battery system ("tuning") can be identified and prevented. However, manipulation of this kind would also be associated with losses in respect of the safety and the service life of a battery system affected by it. The method according to the disclosure and the monitoring device allow the abovementioned manipulation of the connections of the disconnection device to be identified. If manipulation of this kind is identified, measures for protecting the battery system against the action of the said manipulation are initiated according to the disclosure.

Expressed in simple terms, the voltage across the connections of the disconnection device of the battery system is monitored by means of a monitoring device according to the disclosure. This can be done continuously or periodically. According to the disclosure, an external positive or negative voltage across the connections or terminals of the disconnection device of the battery system is detected by means of a monitoring device. If the value of the detected voltage exceeds a specific threshold, which is dependent on the respective system, corresponding measures can be initiated. These initiated measures include, for example, entering a fault value into a fault memory and/or disconnecting the battery and/or communicating an existing situation of a threshold value being exceeded by the value of the voltage which is applied to the connections of the disconnection device to a vehicle controller of a vehicle in which the battery system is installed.

Furthermore, as an additional effect of monitoring the connections of the disconnection device of the battery system, correct closing of the contacts of the disconnection device of the battery system can be established since the two connections of the disconnection device have to be short-circuited in the closed state.

Another aspect of the disclosure relates to a battery system having a battery, a disconnection device and a monitoring device according to the disclosure for monitoring the disconnection device.

According to the disclosure, the battery can be a lithium-ion battery.

In particular, the monitoring device for monitoring the disconnection device comprises at least one cell monitoring apparatus, which is present in the battery system, for monitoring the functional state of at least one battery cell of the battery.

The monitoring device for monitoring the disconnection device preferably comprises a central battery controller, which is present in the battery system, for controlling the battery system.

Expressed in simple terms, the monitoring device according to the disclosure for monitoring the disconnection device of the battery system can be configured as a dedicated device. The monitoring device according to the disclosure for monitoring the disconnection device of the battery system can also be realized using a cell monitoring apparatus (CSC) and/or using the central battery controller (BCU). In the latter two cases, the battery disconnection device is electrically connected to corresponding additional connections (pins) of the respective cell monitoring apparatus (CSC) or of the central battery controller (BCU).

The disclosure further provides a vehicle having the battery system according to the disclosure.

In particular, the vehicle according to the disclosure comprises a vehicle controller for controlling the vehicle, wherein the monitoring device for monitoring the disconnection device can communicate information which concerns a situation of a threshold value being exceeded by the value of the voltage which is applied to the connections of the disconnection device of the battery system to the vehicle controller by means of a corresponding data transmission system.

Advantageous developments of the disclosure are specified and described in the description.

BRIEF DESCRIPTION OF THE DRAWINGS

Exemplary embodiments of the disclosure will be explained in greater detail with reference to the following description and the drawings, in which.

DETAILED DESCRIPTION

Figure 1:
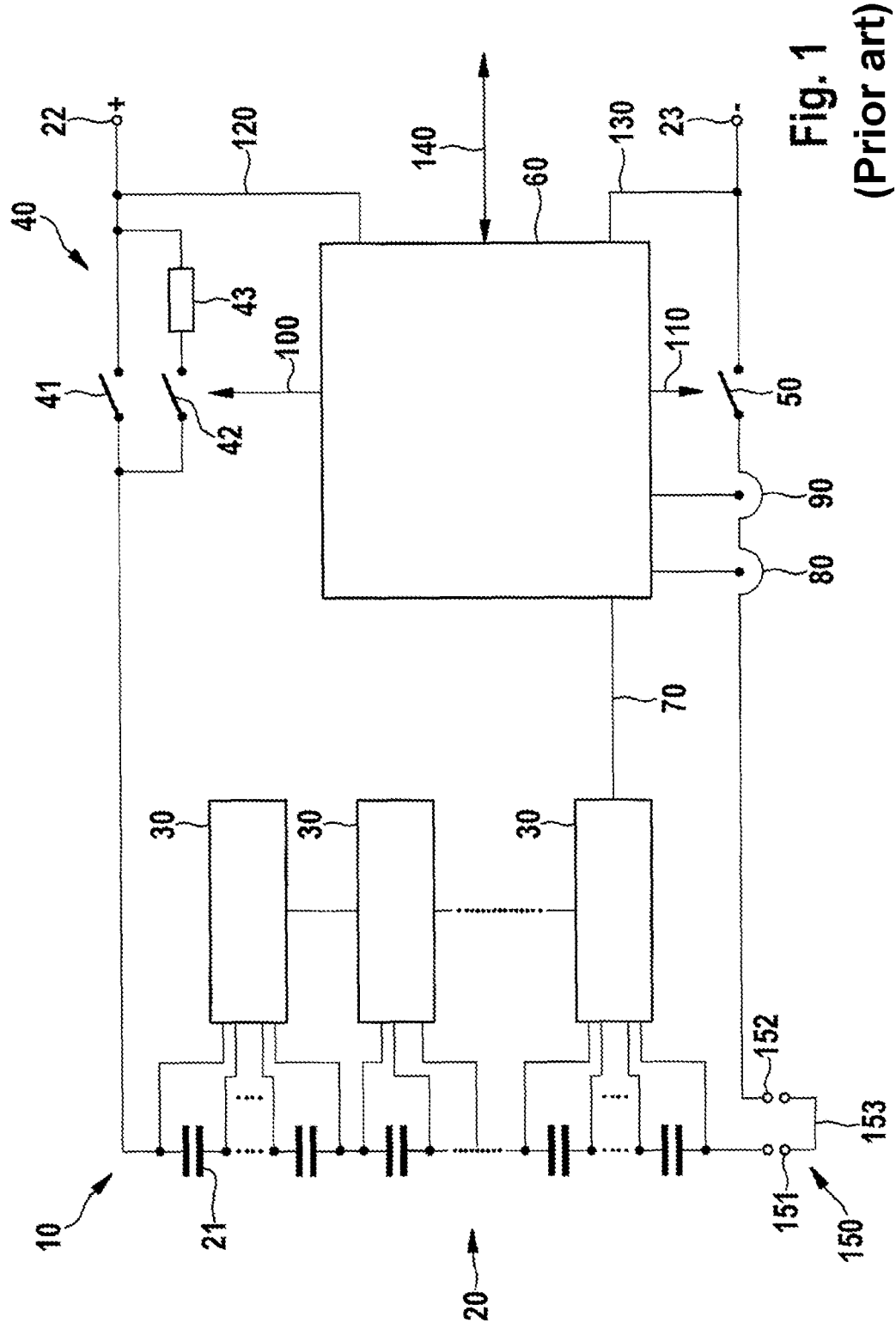
FIG. 1 shows a basic circuit diagram of a battery system, which is known from the prior art, having a disconnection device (service disconnect)
Figure 2:
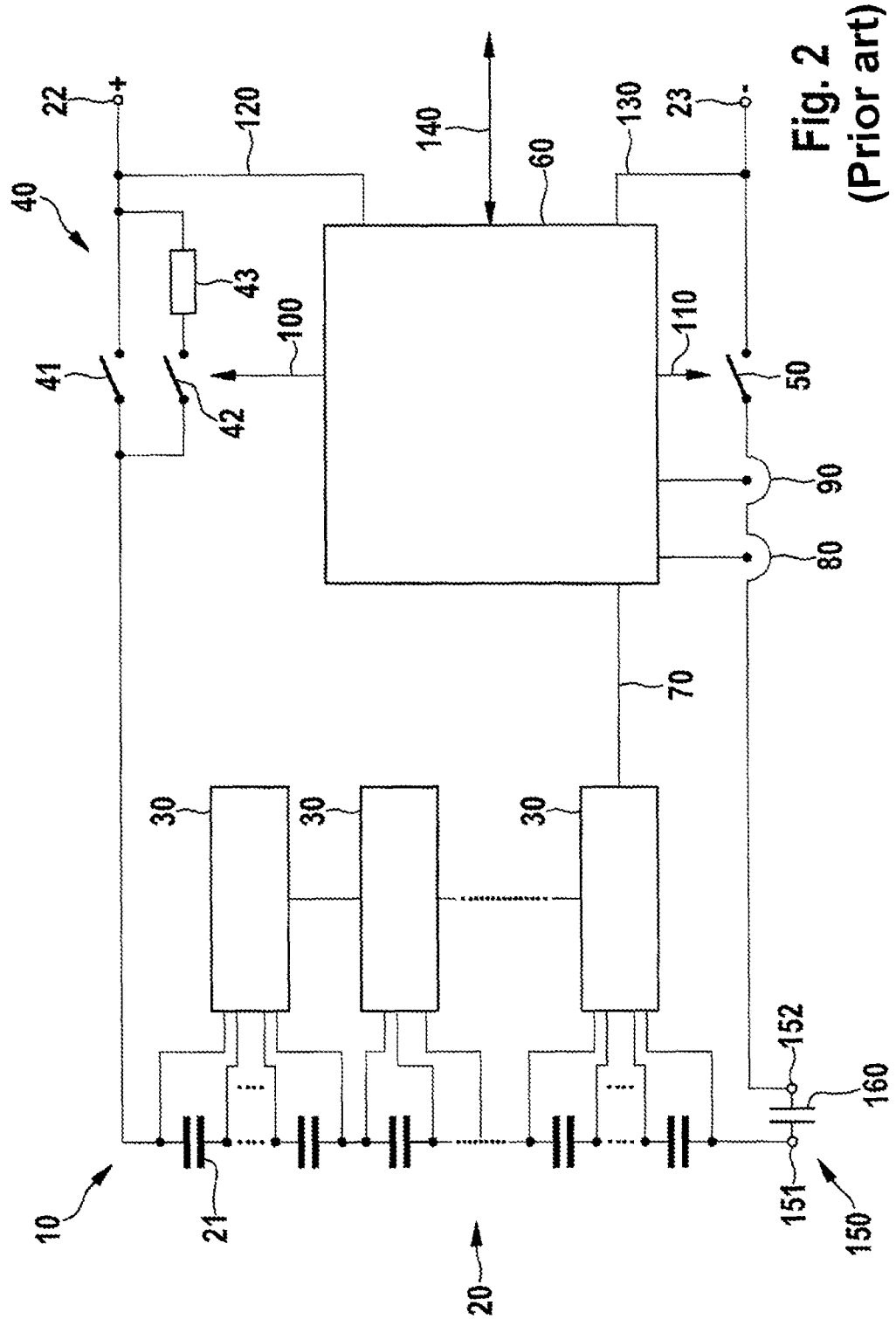
FIG. 2 shows the basic circuit diagram of the battery system, which is known from the prior art and is illustrated in FIG. 1, in which an external battery is connected to the connections of the disconnection device.
Figure 3:
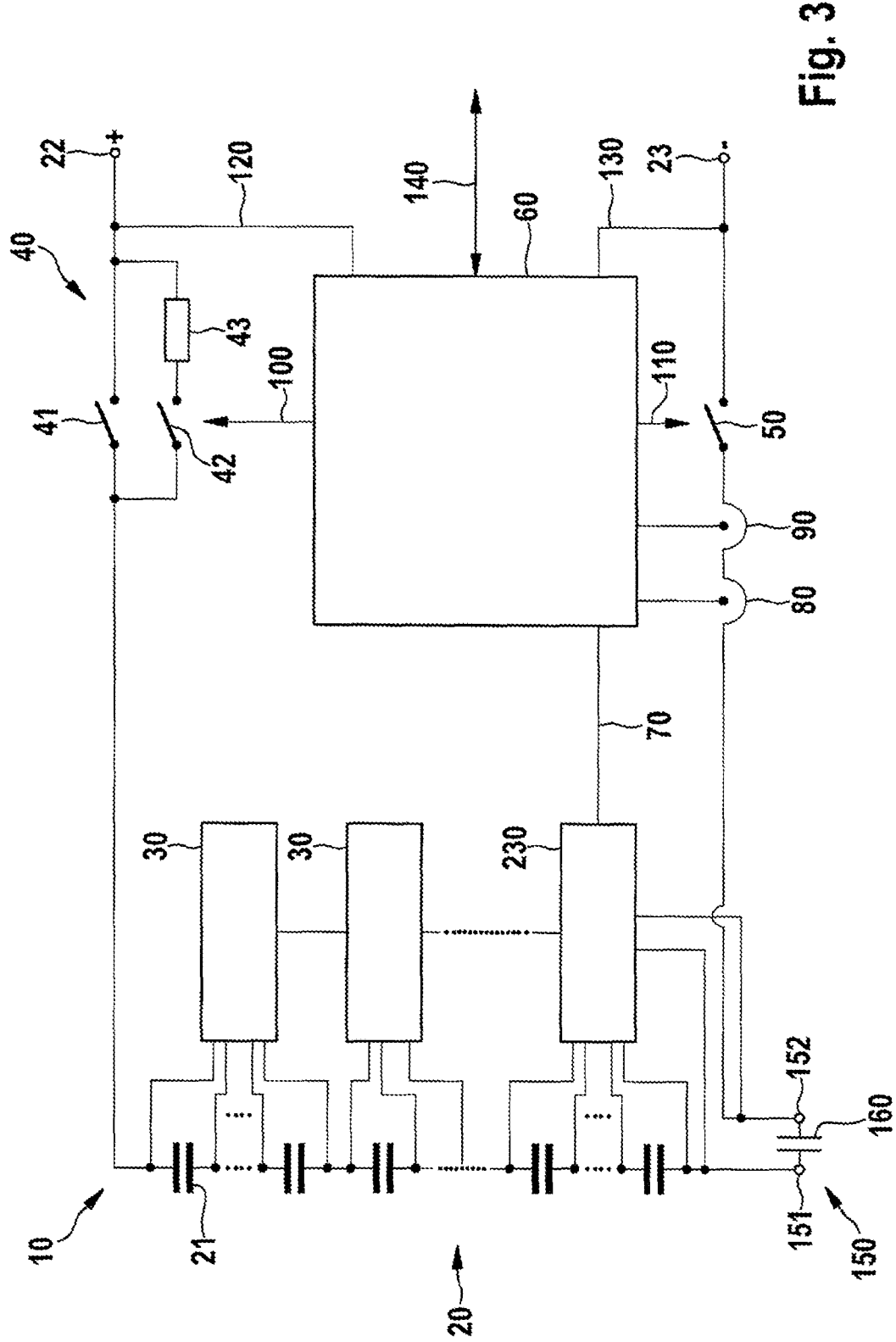
FIG. 3 shows a basic circuit diagram of a battery system, which comprises a disconnection device, according to a first embodiment of the disclosure, wherein an external battery is connected to the connections of the disconnection device and the disconnection device is monitored by means of a cell monitoring apparatus (CSC) which is electrically connected to it.

FIG. 3 shows a basic circuit diagram of a battery system 10 according to a first embodiment of the disclosure. The battery system 10 which is illustrated in FIG. 3 is of similar construction to the battery system which is illustrated in FIG. 2, with the difference that the disconnection device 150 is electrically connected to a cell monitoring apparatus (CSC) 230 which is contained in the battery system 10. In the battery system 10 which is illustrated in FIG. 3, an external battery 160 is connected between the connections 151, 152 of the disconnection device 150. In this case, the cell monitoring apparatus 230 is electrically connected to each of the two connections 151, 152 of the disconnection device (service disconnect) 150 and is configured to continuously or periodically detect the voltage which is applied to the connections 150 and to evaluate the said voltage in order to establish the functional state of the disconnection device 150.

Furthermore, the cell monitoring apparatus 230 is configured to initiate measures for protecting the battery system 10 against manipulation of its disconnection device 150 if the value of the voltage which is applied to the connections 151, 152 of the operating device 150 exceeds a threshold value which is dependent on the battery system 10.

In particular, the cell monitoring apparatus 230 which is connected to the disconnection device 150 is configured to transmit information relating to a situation of the threshold value being exceeded by the value of the voltage which is applied to the connections 151, 152 of the disconnection device 150 being established to the central battery controller 60 by means of the internal bus system 70. The battery controller 60 can comprise a fault memory (not illustrated) in which the information which is communicated by the cell monitoring apparatus 230 relating to the situation of the threshold value being exceeded by the value of the voltage which is applied to the connections 151, 152 of the disconnection device 150 being established can be entered as a fault value and can be taken into consideration by the central battery controller 60 when calculating the parameters which are relevant for the battery system.

Furthermore, the central battery controller 60 can disconnect the battery 20 on account of the information, which is transmitted by the cell monitoring apparatus 230, relating to the situation of the threshold value being exceeded by the value of the voltage which is applied to the connections 151, 152 of the disconnection device 150 being established.

Furthermore, the information, which is communicated or transmitted by the cell monitoring apparatus 230, relating to the situation of the threshold value being exceeded by the value of the voltage which is applied to the connections 151, 152 of the disconnection device 150 being established can be communicated to a vehicle controller (not illustrated) for further evaluation by means of the central battery controller 60 by the CAN bus system 140 by means of which the central battery controller 60 can be connected to a vehicle interface.

What is claimed is:

1. A method for monitoring a disconnection device having a first terminal and a second terminal and being configured to disconnect series connected battery cells of a battery of a battery system by disconnecting the first terminal from the second terminal, the method comprising:
   detecting, with a monitoring device that is connected to the disconnection device, a voltage between the first terminal of the disconnection device and the second terminal of the disconnection device;
   evaluating the detected voltage to determine a functional state of the disconnection device; and
   initiating measures to protect the battery system against manipulation of the disconnection device when a value of the negative voltage exceeds a predetermined threshold value.

2. The method according to claim 1, further comprising at least one of:
   storing information which concerns an existing situation of the predetermined threshold value being exceeded in a fault memory, which is one of contained in the monitoring device and or is connected to the monitoring device, as an entry of a faulty functional state of the disconnection device for further evaluation;
   disconnecting the battery; and
   communicating information relating to the existing situation of the predetermined threshold value being exceeded to a controller, which is one of contained in the monitoring device and connected to the monitoring device, for further evaluation as measures for protecting the battery system.

3. The method according to claim 1, wherein the detected voltage is detected one of continuously and periodically.

4. A monitoring device for monitoring a disconnection device having a first terminal and a second terminal and being configured to disconnect series connected battery cells of a battery of a battery system by disconnecting the first terminal from the second terminal, the monitoring device comprising:
   a first connection configured to electrically connect the monitoring device to the first terminal of the disconnection device;
   a second connection configured to electrically connect the monitoring device to the second terminal of the disconnection device;
   a detection unit configured to detect a voltage between the first terminal of the disconnection device and the second terminal of the disconnection device;

an evaluation unit configured to evaluate the detected voltage to determine a functional state of the disconnection device; and an initiation unit configured to initiate measures to protect the battery system against manipulation of the disconnection device when a value of the detected voltage exceeds a predetermined threshold value.

5. The monitoring device of claim 4, wherein the monitoring device is configured to at least one of:

enter information which concerns an existing situation of the predetermined threshold value being exceeded in a fault memory, which is one of contained in the monitoring device and or is connected to the monitoring device, as a faulty functional state of the disconnection device for further evaluation;

disconnect the battery; and communicate information relating to the existing situation of the threshold value being exceeded to a controller, which is one of contained in the monitoring device and connected to the monitoring device, for further evaluation as measures for protecting the battery system.

6. A battery system, comprising:

a battery comprising a plurality of series connected battery cells;

a disconnection device configured in series with the series connected battery cells, the disconnection device having a first terminal and a second terminal and being configured to disconnect the battery cells of the battery by disconnecting the first terminal from the second terminal; and a monitoring device configured to monitor the disconnection device, the monitoring device being to electrically connected to the first terminal of the disconnection device and the second terminal of the disconnection device, the monitoring device being configured to:

detect a voltage between the first terminal of the disconnection device and the second terminal of the disconnection device;

evaluate the detected voltage to determine a functional state of the disconnection device; and initiate measures to protect the battery system against manipulation of the disconnection device when a value of the detected voltage exceeds a predetermined threshold value.

7. The battery system according to claim 6, wherein the monitoring device includes at least one cell monitoring apparatus configured to monitor a functional state of at least one battery cell of the battery.

8. The battery system according to claim 6, wherein the monitoring device includes a central battery controller configured to control the battery system.

9. The battery system according to claim 6, wherein the battery system is connected to a drive train of a vehicle.

10. The battery system according to claim 9, wherein the monitoring device is configured to communicate information about an existing situation of the predetermined threshold value being exceeded by the value of the detected voltage to a vehicle controller configured to control the vehicle.

\* \* \* \* \*